United States Patent
Nakajima et al.

(10) Patent No.: US 10,059,290 B2
(45) Date of Patent: Aug. 28, 2018

(54) VEHICLE BUMPER

(71) Applicant: TOYOTA JIDOSHA KABUSHIKI KAISHA, Toyota-shi, Aichi-ken (JP)

(72) Inventors: Tetsuya Nakajima, Toyota (JP); Kazuki Sugie, Toyota (JP); Tetsuo Nuruki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/314,786

(22) PCT Filed: Jun. 10, 2015

(86) PCT No.: PCT/IB2015/000894
§ 371 (c)(1),
(2) Date: Nov. 29, 2016

(87) PCT Pub. No.: WO2015/189679
PCT Pub. Date: Dec. 17, 2015

(65) Prior Publication Data
US 2017/0182960 A1 Jun. 29, 2017

(30) Foreign Application Priority Data
Jun. 13, 2014 (JP) ................. 2014-122410

(51) Int. Cl.
*B60R 19/18* (2006.01)
*B60R 19/34* (2006.01)

(52) U.S. Cl.
CPC .............. *B60R 19/34* (2013.01); *B60R 19/18* (2013.01); *B60R 2019/182* (2013.01)

(58) Field of Classification Search
CPC .................... B60R 19/34; B60R 2019/182
USPC .................................. 293/102, 132, 133
See application file for complete search history.

(56) References Cited

U.S. PATENT DOCUMENTS

| | | | |
|---|---|---|---|
| 5,785,367 A | 7/1998 | Baumann et al. | |
| 6,299,226 B1 * | 10/2001 | Kroning | B60R 19/18 293/120 |
| 9,610,910 B2 * | 4/2017 | Muskos | B60R 19/18 |
| 2013/0119683 A1 | 5/2013 | Blumel et al. | |
| 2013/0171021 A1 | 7/2013 | Yaokawa et al. | |
| 2015/0071817 A1 | 3/2015 | Sasaki et al. | |

FOREIGN PATENT DOCUMENTS

| | | |
|---|---|---|
| DE | 102007038496 A1 | 2/2009 |
| DE | 202008017596 U1 | 2/2010 |
| JP | H06-286536 A | 10/1994 |
| JP | H08-276802 A | 10/1996 |
| JP | 2008-201367 A | 9/2008 |
| JP | 2009-101731 A | 5/2009 |
| JP | 2010-264879 A | 11/2010 |
| JP | 2012-061518 A | 3/2012 |
| JP | 2013-193098 A | 9/2013 |

* cited by examiner

*Primary Examiner* — Hilary L Gutman
(74) *Attorney, Agent, or Firm* — Oliff PLC

(57) ABSTRACT

An impact absorbing portion and a bumper reinforcement are formed in one piece, so an intermediate member for connecting the impact absorbing portion to the bumper reinforcement is no longer necessary. Therefore, the generation of stress concentration is able to be inhibited. As a result, load transmission efficiency with which a load is transmitted from the bumper reinforcement to the impact absorbing portion is able to be improved.

10 Claims, 4 Drawing Sheets

VEHICLE BUMPER

BACKGROUND OF THE INVENTION

1. Field of the Invention

The invention relates to a vehicle bumper.

2. Description of Related Art

Japanese Patent Application Publication No. 2009-101731 (JP 2009-101731 A), for example, describes technology in which a crush box (an impact absorbing portion) is provided between a front side member and a front bumper reinforcement. More specifically, an end flange is fixed to a front end portion of the front side member, and an end flange provided on a rear end portion of the crush box is fixed to this end flange. Also, a connecting base portion of the front bumper reinforcement is fixed (connected) to an end flange formed on a front end portion of the crush box.

Also, a front bumper support is fitted to the exterior of the crush box. This front bumper support is welded (connected) to an upper surface and a lower surface of the front bumper reinforcement. Therefore, when an impact load is input to the front bumper reinforcement when the vehicle is involved in a frontal collision, a portion of this impact load is transmitted from the front bumper reinforcement to the crush box via the front bumper support.

As described above, in this related art, there are a large number of connecting sites, so stress may concentrate at these connecting sites when an impact load input to the front bumper reinforcement is transmitted to the crush box. In this case, the connecting sites may also fracture, so there is room for further improvement regarding this point.

SUMMARY OF THE INVENTION

The invention provides a vehicle bumper capable of efficiently transmitting an impact load input to a bumper reinforcement to an impact absorbing portion.

One aspect of the invention relates to a vehicle bumper that includes a bumper reinforcement that is arranged such that a length direction of the bumper reinforcement is in coincidence with a vehicle width direction; and an impact absorbing portion that extends from the bumper reinforcement toward a vehicle cabin inside. The impact absorbing portion and the bumper reinforcement are formed in one piece, and the impact absorbing portion is less rigid than the bumper reinforcement.

In the vehicle bumper described above, the impact absorbing portion extends from the bumper reinforcement toward the vehicle cabin inside. Also, the impact absorbing portion and the bumper reinforcement are formed in one piece, and the impact absorbing portion is less rigid than the bumper reinforcement.

By having the impact absorbing portion and the bumper reinforcement be formed in one piece in this way, a member for connecting the impact absorbing portion to the bumper reinforcement is not interposed therebetween.

For example, another member is interposed between the bumper reinforcement and the impact absorbing portion. In this case, when an impact load is input to the bumper reinforcement when the vehicle is involved in a frontal collision, stress may concentrate at the connecting portion where the two members are connected, and this connecting portion may fracture in some cases.

However, the generation of this stress concentration is able to be suppressed because the intermediate member for connecting the impact absorbing portion to the bumper reinforcement is unnecessary due to the fact that the two are formed in one piece. As a result, the load transmission efficiency by which a load is transmitted from the bumper reinforcement to the impact absorbing portion is able to be improved, so the impact energy is able to be absorbed by the impact absorbing portion.

As described above, the vehicle bumper has the beneficial effect in which it is able to efficiently transmit an impact load input to the bumper reinforcement, to the impact absorbing portion.

In the vehicle bumper described above, the impact absorbing portion may also be provided with a widened portion that widens in the vehicle width direction, the widened portion being provided on a bumper reinforcement side of the impact absorbing portion.

With this vehicle bumper, when the widened portion is provided in the center in the vehicle width direction on the bumper reinforcement side, the impact load is able to be transmitted to this widened portion when a front collision (a pole frontal collision) in a manner in which an impact load is input to the center portion of the bumper reinforcement in the vehicle width direction from a pole such as a utility pole occurs.

Also, when the widened portion is provided on the outside in the vehicle width direction, the widened portion being provided on the bumper reinforcement side of the impact absorbing portion, the impact load is able to be transmitted to this widened portion when an oblique collision or a frontal collision (small overlap collision) of a manner in which an impact load is input by a collision body toward the outside of the bumper reinforcement in the vehicle width direction occurs.

The vehicle bumper has the beneficial effect in which it is able to improve collision safety performance with respect to a collision in which the overlap amount of a collision body with respect to the bumper reinforcement is small.

In the vehicle bumper described above, the widened portion of the impact absorbing portion may include a first widened portion provided on an outside in the vehicle width direction on the bumper reinforcement side of the impact absorbing portion, and a second widened portion provided on an inside in the vehicle width direction on the bumper reinforcement side of the impact absorbing portion.

In the vehicle bumper described above, the widened portion of the impact absorbing portion may widen in an arc shape from an outside wall of a front side member toward an end portion of the bumper reinforcement in the length direction. Also, the widened portion of the impact absorbing portion may protrude toward the outside in the vehicle width direction from the outside wall of the front side member.

In the vehicle bumper described above, a thickness of an outside wall of the bumper reinforcement at a center portion of the bumper reinforcement in the length direction may be thicker than the thickness of the outside wall of the bumper reinforcement at an end portion of the bumper reinforcement in the length direction.

In this vehicle bumper, the thickness of the outside wall of the bumper reinforcement at the center portion of the bumper reinforcement in the length direction is formed thicker than the thickness of the outside wall of the bumper reinforcement on the end portion of the bumper reinforcement in the length direction, so the center portion of the bumper reinforcement in the length direction is that much more rigid than the end portion of the bumper reinforcement in the length direction. Therefore, the rigidity of the center portion (in the length direction) of the bumper reinforcement is higher than the rigidity of the end portion side, so deformation of the center portion of the bumper reinforcement is able to be suppressed when a pole frontal collision occurs, for example.

The vehicle bumper has the beneficial effect in which it is able to improve collision safety performance with respect to a collision in which a collision body collides with the center portion of the bumper reinforcement in the length direction.

In the vehicle bumper described above, the thickness of the outside wall of the bumper reinforcement may become continuously thinner from the center portion of the bumper reinforcement in the length direction toward the end portion of the bumper reinforcement in the length direction.

For example, if the thickness of the outside wall of the bumper reinforcement becomes thinner in a stepped manner in the length direction of the bumper reinforcement, the rigidity will change suddenly, so the bumper reinforcement may fracture more easily starting at the portion where the rigidity suddenly changes when a frontal collision occurs.

Therefore, with the vehicle bumper described above, the bumper reinforcement is formed such that the thickness of the outside wall of the bumper reinforcement becomes continuously thinner from the center portion of the bumper reinforcement in the length direction toward the end portion of the bumper reinforcement in the length direction. By having the thickness of the outside wall of the bumper reinforcement change continuously with respect to the length direction of the bumper reinforcement in this way, the bumper reinforcement is able to be inhibited from fracturing when a frontal collision occurs.

The vehicle bumper has the beneficial effect in which it is able to inhibit the bumper reinforcement from fracturing when a frontal collision occurs.

In the vehicle bumper described above, a sectional shape of the bumper reinforcement when the bumper reinforcement is cut in a vehicle front-rear direction orthogonal to the length direction of the bumper reinforcement may be a rectangular-shaped closed sectional structure.

In the vehicle bumper described above, a weak portion that compresses and deforms with respect to an impact force in a vehicle front-rear direction may be formed on the impact absorbing portion.

In the vehicle bumper described above, the weak portion may be formed by a plurality of grooves formed extending in a direction orthogonal to the length direction of the impact absorbing portion.

In the vehicle bumper described above, the impact absorbing portion and the bumper reinforcement may be formed in one piece by a free casting method in which a mold is not used.

In this vehicle bumper, the impact absorbing portion and the bumper reinforcement are formed in one piece by a free casting method in which a mold is not used, so the degree of freedom regarding the shape of the vehicle bumper improves.

The vehicle bumper has the beneficial effect in which the number of parts is able to be reduced by forming the impact absorbing portion and the bumper reinforcement in one piece.

In the vehicle bumper described above, a manufacturing apparatus in the free casting method in which a mold is not used may be provided with an outside shape determining member that forms an outside shape of a casting, and an inside shape determining member that forms an inside shape of the casting. Also, a thickness of the casting and a shape of the casting may be changed by changing a distance between the outside shape determining member and the inside shape determining member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
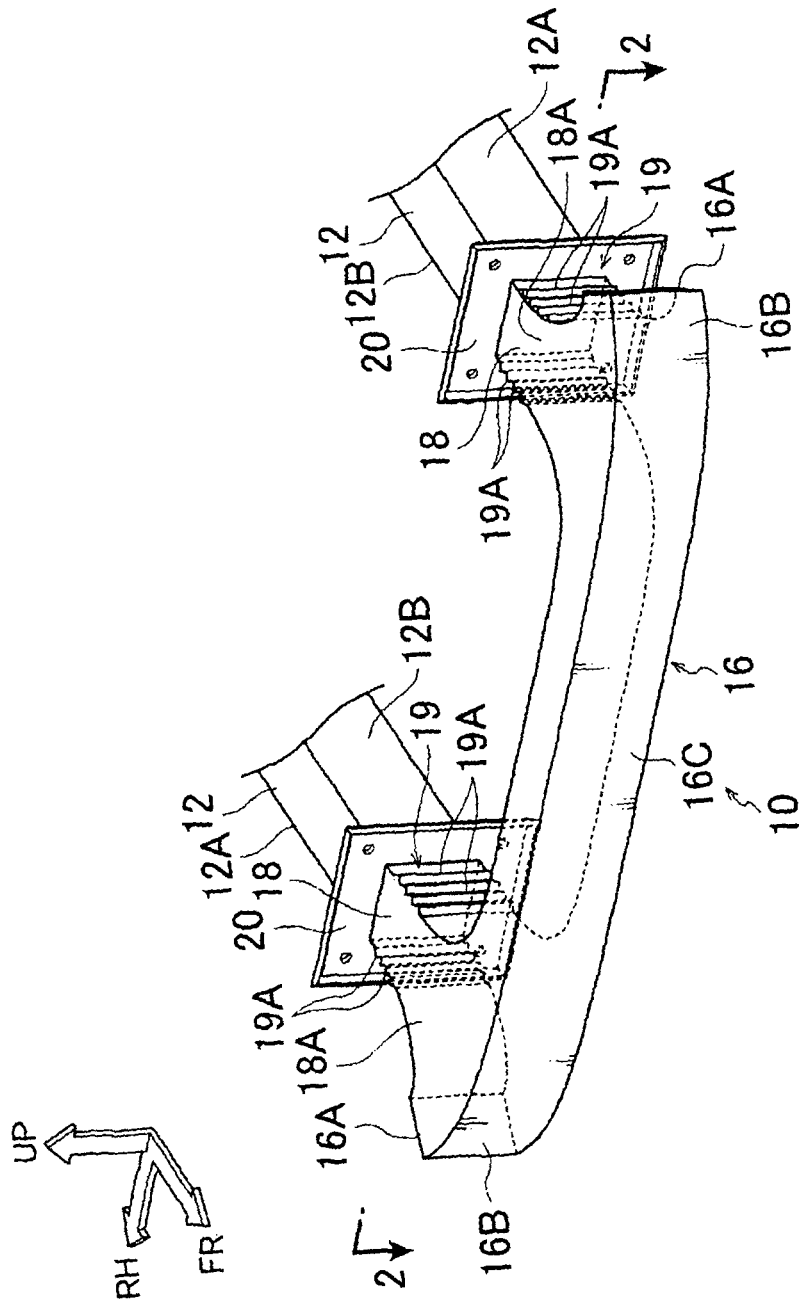
FIG. 1 is a perspective view schematically showing a vehicle bumper according to one example embodiment of the invention.

A vehicle bumper according to one example embodiment of the invention will now be described with reference to the accompanying drawings. The arrows FR, UP, and RH shown as appropriate in the drawings indicate the directions of front, up, and right, respectively, with respect to a vehicle to which a vehicle bumper 10 is applied. Hereinafter, in descriptions using simply the front-rear, up-down, and left-right directions, these will be indicated as front or rear in the front-rear direction of the vehicle, up and down in the up-down direction of the vehicle, and left and right when facing forward, unless otherwise specified.

(General Outline of the Vehicle Bumper)

Figure 2:
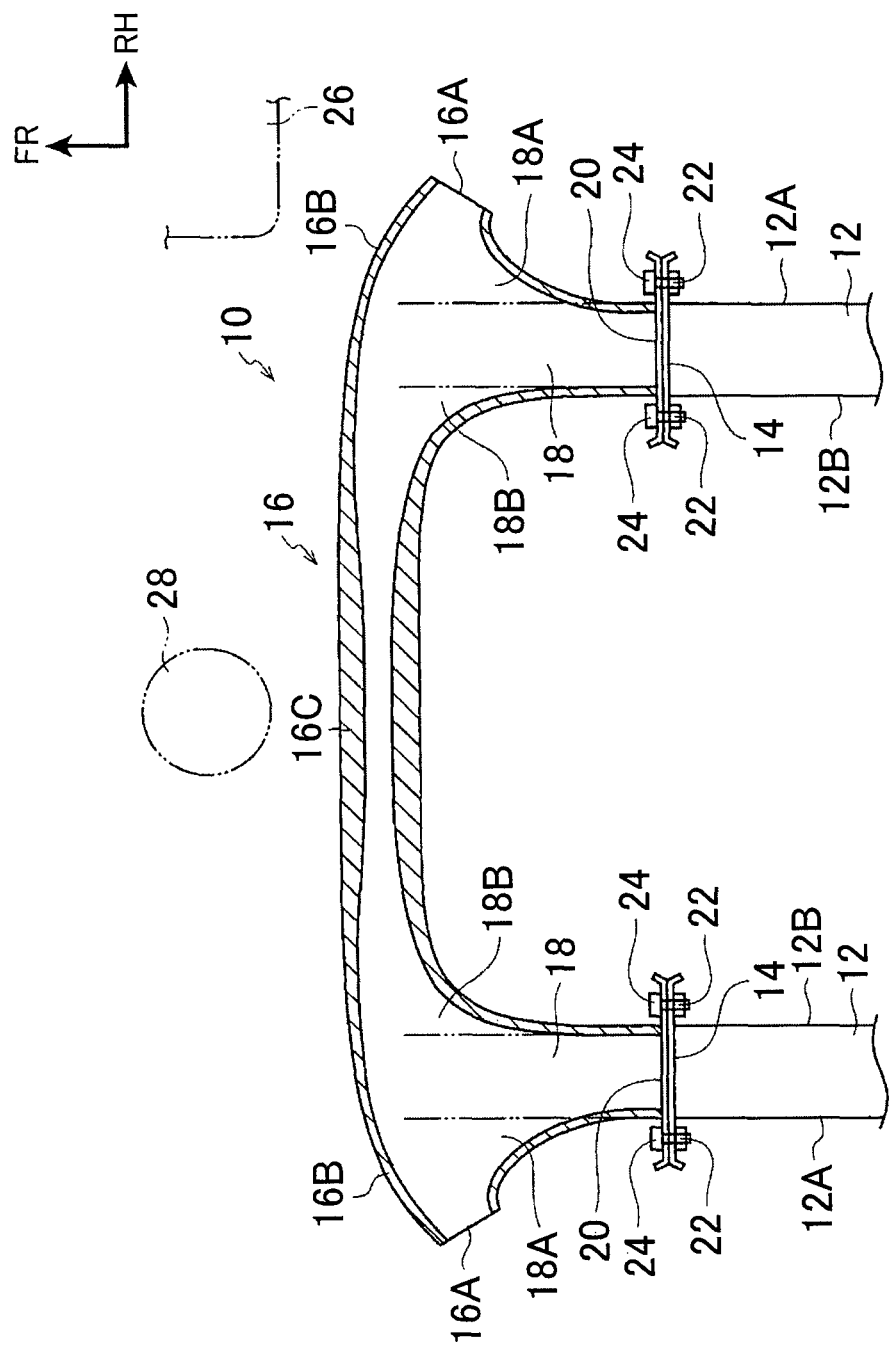
FIG. 2 is a partial sectional view taken along line 2-2 in FIG. 1.
Figure 3:
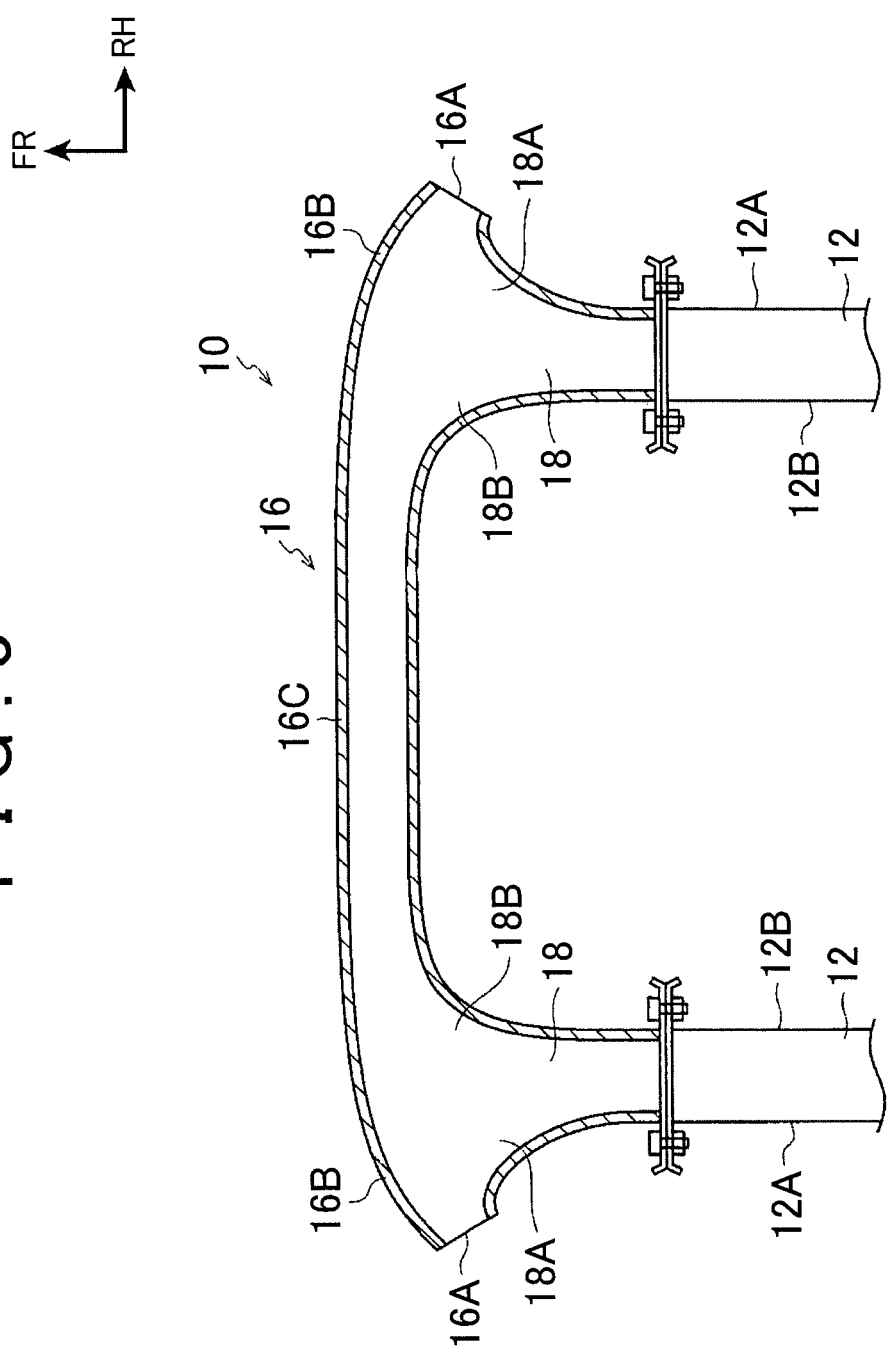
FIG. 3 is a modified example of FIG. 2.

FIG. 1 is a perspective view of the general outline of the vehicle bumper 10, and FIG. 2 is a partial sectional view taken along line 2-2 in FIG. 1. As shown in FIGS. 1 and 2, the vehicle bumper 10 is provided on a front side of a pair of front side members 12 that are arranged such that a length direction of the front side members 12 is in coincidence the vehicle front-rear direction. Each front side member 12 has a closed sectional structure in which a sectional shape when the front side member 12 is cut in a vehicle width direction orthogonal to the length direction is generally rectangular. A generally rectangular flange portion 14 is provided on a front end portion of each front side member 12.

Meanwhile, the vehicle bumper 10 is provided on a vehicle front portion, and a bumper reinforcement 16 that forms a portion of the vehicle bumper 10 extends in the vehicle width direction. A curved portion 16B that curves toward the rear as the curved portion 16B extends toward the outside in the vehicle width direction is provided on both end portions 16A of the bumper reinforcement 16 in the vehicle width direction.

Also, although not shown, a sectional shape of the bumper reinforcement 16 when cut in the vehicle front-rear direction orthogonal to the length direction of the bumper reinforcement 16 is a generally rectangular closed sectional structure. As shown in FIG. 2, a center portion 16C of the bumper reinforcement 16 in the length direction is formed having a thicker outer wall than the end portions 16A in the length direction. The thickness of this outer wall becomes continuously thinner from the center portion 16C of the bumper reinforcement 16 in the length direction toward both end portion 16A sides in the length direction.

Also, an impact absorbing portion 18 is integrally formed with the bumper reinforcement 16 (i.e., the impact absorbing portion 18 and the bumper reinforcement 16 are formed as one piece), on both end portion 16A sides of the bumper reinforcement 16 in the length direction. Both impact absorbing portions 18 extend toward the rear (i.e., a vehicle cabin inside) from both end portion 16A sides of the bumper reinforcement 16 in the length direction.

The sectional shape of each impact absorbing portion 18 when the impact absorbing portion 18 is cut in the vehicle width direction orthogonal to the length direction thereof is a generally rectangular closed sectional structure. A weak portion 19 (see FIG. 1) that will compress and deform with respect to an impact force in the vehicle front-rear direction is formed on each impact absorbing portion 18. A plurality of grooves 19A (see FIG. 1) are formed in a direction substantially orthogonal to the length direction of the impact absorbing portion 18 (i.e., to the vehicle front-rear direction), for example, as the weak portion 19. With the grooves formed, when an impact load is transmitted to the impact absorbing portion 18, the impact absorbing portion 18 will compress and deform starting at the grooves 19A, and as a result, the impact energy will be absorbed. The weak portion 19 is omitted in FIGS. 2 to 4A and 4B.

As shown in FIG. 2, in this example embodiment, the impact absorbing portion 18 has a widened portion 18A provided on the outside in the vehicle width direction, on the bumper reinforcement 16 side of the impact absorbing portion 18. This widened portion 18A becomes wider in an arc shape while protruding farther outward than an outside wall 12A of the front side member 12 toward the end portion 16A of the bumper reinforcement 16 in the length direction from the outside wall 12A of the front side member 12.

The impact absorbing portion 18 also has a widened portion 18B provided on the inside in the vehicle width direction, on the bumper reinforcement 16 side of the impact absorbing portion 18. The widened portion 18B becomes wider in an arc shape while protruding farther inward than an inside wall 12B of the front side member 12 toward the center of the bumper reinforcement 16 in the length direction from the inside wall 12B of the front side member 12.

Also, a generally rectangular flange portion 20 is provided on a rear end portion of each impact absorbing portion 18. The flange portion 20 is able to abut against the flange portion 14 provided on the front end portion of the front side member 12. While the flange portion 14 is abutted against the flange portion 20, the impact absorbing portion 18 (the bumper reinforcement 16 via the impact absorbing portion 18) is connected to the front side member 12 via the flange portion 14 and the flange portion 20 by bolts 22 and nuts 24.

Here, the bumper reinforcement 16 is formed by a free casting method that does not use a mold, using metal such as an aluminum alloy or a magnesium alloy. With the free casting method, the manufacturing apparatus described in Japanese Patent Application Publication No. 2013-193098 (JP 2013-193098 A) already submitted for application by the applicant may be used.

Although not shown, this manufacturing apparatus is provided with an outside shape determining member for determining the outside shape of a casting, and an inside shape determining member for forming the inside shape of the casting, and the thickness of the outside wall of the casting, as well as the shape of the casting, are able to be changed by changing the distance between the outside shape determining member and the inside shape determining member.

(Operation and Effect of the Vehicle Bumper)

Typically, the bumper reinforcement 16 needs to have a predetermined strength and rigidity because when an impact load is input to the bumper reinforcement 16, this impact load needs to be transmitted rearward and in the vehicle width direction. That is, it is necessary to inhibit deformation. In contrast, when an impact load is input to the impact absorbing portion 18, the impact absorbing portion 18 needs to deform in order to absorb the impact energy.

Figure 4A:
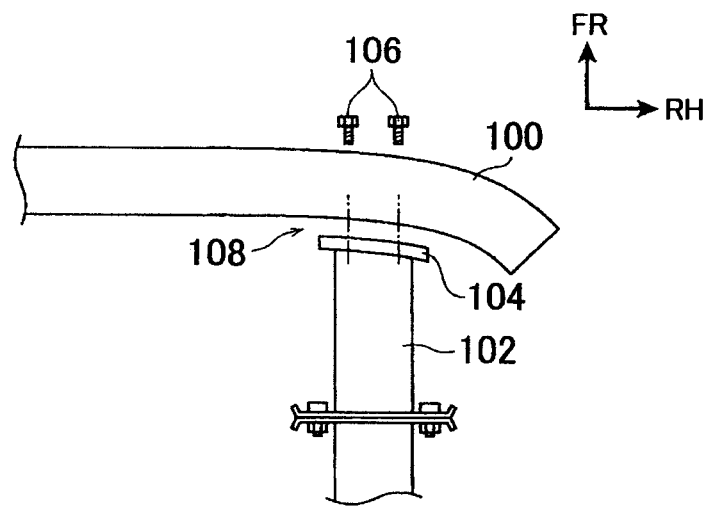
FIG. 4A is a plan view of a comparative example.

Therefore, as shown in FIG. 4A, a bumper reinforcement 100 and an impact absorbing portion 102 are formed by separate members, and both of these are fixed together to form a single integrated member by fastening (at a fastening portion 108) a flange portion 104 provided on a front end portion of the impact absorbing portion 102 to the bumper reinforcement 100 by bolts 106 and nuts, not shown. However, the fastening portion 108 changes shape suddenly, so stress tends to concentrate there more easily than at other portions. Thus, when an impact load is input to the bumper reinforcement 100, stress may concentrate at the fastening portion 108. If stress concentrates at the fastening portion 108 in this way, the fastening portion 108 may fracture.

Figure 4B:
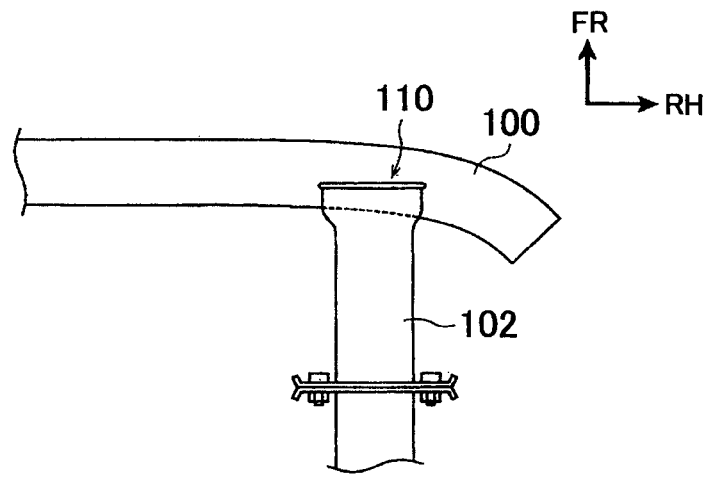
FIG. 4B is a plan view of another comparative example.

Also, aside from this, as shown in FIG. 4B, there is also a structure in which the impact absorbing portion 102 and the bumper reinforcement 100 are joined to form a single integrated member by welding (at a joint 110). However, in this case as well, the joint 110 changes shape suddenly, so stress tends to concentrate there more easily than at other portions. Thus, when an impact load is input to the bumper reinforcement 100, stress may concentrate at the joint 110, and the joint 110 may fracture.

However, in this example embodiment, the impact absorbing portion 18 and the bumper reinforcement 16 are formed in one piece, as shown in FIG. 2. Therefore, in this example embodiment, an intermediate member for connecting the impact absorbing portion 18 and the bumper reinforcement 16 together is not necessary, so the concentration of stress described above is able to be inhibited.

As a result, the load transmission efficiency with which a load is transmitted from the bumper reinforcement 16 to the impact absorbing portion 18 is able to be improved, so the impact energy is able to be absorbed by the impact absorbing portion 18. Also, the intermediate member is not provided, so the number of parts is able to be reduced. Consequently, man-hours are able to be reduced, and as a result, cost is able to be reduced.

Further, in this example embodiment, the impact absorbing portion 18 has the widened portion 18A provided on the outside in the vehicle width direction, on the bumper reinforcement 16 side of the impact absorbing portion 18. Therefore, an impact load is able to be transmitted to the widened portion 18A when an oblique collision or a frontal collision (small overlap collision) of a manner in which an impact load is input by a collision body 26 toward the outside of the bumper reinforcement 16 in the vehicle width direction occurs. Therefore, according to this example embodiment, collision safety performance with respect to a collision in which the overlap amount of the collision body 26 with respect to the bumper reinforcement 16 is small is able to be improved.

Also, the widened portion 18A becomes wider in an arc shape while protruding farther outward than the outside wall 12A of the front side member 12 toward the end portion 16A of the bumper reinforcement 16 in the length direction from the outside wall 12A of the front side member 12. Having the widened portion 18A be formed in an arc shape in this way enables the concentration of stress at the widened portion 18A to be inhibited when an impact load is transmitted to the impact absorbing portion 18. Also, the widened portion 18A substantially inclines outward in the vehicle width direction as the widened portion 18A extends toward the front side of the vehicle, so the impact load is effectively transmitted to the widened portion 18A particularly when an oblique collision occurs.

Further, the impact absorbing portion 18 has the widened portion 18B provided on the inside in the vehicle width direction, on the bumper reinforcement 16 side of the impact absorbing portion 18. Therefore, the impact load is able to be transmitted to the widened portion 18B when a frontal collision (pole frontal collision) in a manner in which an impact load is input to the center portion of the bumper reinforcement 16 in the vehicle width direction from a pole 28 such as a utility pole occurs.

Also, the widened portion 18B becomes wider in an arc shape while protruding farther inward than the inside wall 12B of the front side member 12 toward the center of the bumper reinforcement 16 in the length direction from the inside wall 12B of the front side member 12. Having the widened portion 18B be formed in an arc shape in this way enables the concentration of stress at the widened portion 18B to be inhibited when an impact load is transmitted to the impact absorbing portion 18.

Providing the widened portions 18A and 18B on the bumper reinforcement 16 side of the impact absorbing portion 18 enables an impact load input to the bumper reinforcement 16 to be more effectively transmitted to the front side member 12 side than when the widened portions 18A and 18B are not provided. Of course, it is also possible to provide only one of the widened portions 18A and 18B.

Also, in this example embodiment, the thickness of the outside wall of the bumper reinforcement 16 at the center portion 16C in the length direction is formed thicker than the thickness of the outside wall of the bumper reinforcement 16 on the end portion 16A sides in the length direction. Therefore, the bumper reinforcement 16 is more rigid at the center portion 16C in the length direction than it is on the end portion 16A sides in the length direction. Therefore, deformation of the center portion 16C of the bumper reinforcement 16 is able to be suppressed when a so-called pole frontal collision occurs, for example.

Furthermore, in this example embodiment, the bumper reinforcement 16 is formed such that the thickness of the outside wall thereof becomes continuously thinner from the center portion 16C in the length direction toward the end portion 16A sides in the length direction. For example, although not shown, if the thickness of the outside wall of the bumper reinforcement 16 becomes thinner in a stepped manner in the length direction of the bumper reinforcement 16, the rigidity will change suddenly, so the bumper reinforcement 16 may fracture more easily starting at the portion where the rigidity suddenly changes when a frontal collision occurs.

However, in this example embodiment, the bumper reinforcement 16 is set such that the thickness of the outside wall becomes continuously thinner from the center portion 16C in the length direction toward the end portion 16A sides in the length direction, as described above. By having the thickness of the outside wall of the bumper reinforcement 16 change continuously with respect to the length direction of the bumper reinforcement 16 in this way, the bumper reinforcement 16 is able to be inhibited from fracturing when a frontal collision occurs.

As described above, a plurality of grooves 19A are formed in a direction substantially orthogonal to the length direction of the impact absorbing portion 18, for example, as the weak portion 19. When this impact absorbing portion 18 is molded with a die cast, for example, a slide die is needed when forming the grooves 19A, so the die cast itself ends up being that much larger. Therefore, if the impact absorbing portion 18 and the bumper reinforcement 16 are formed in one piece, the die cast will end up being even larger.

However, in this example embodiment, the bumper reinforcement 16 is formed according to a so-called free casting method, so this kind of problem does not occur. Also, with the impact absorbing portion 18, the grooves 19A are able to be formed easily simply by bringing the outside shape determining member, not shown, closer to the inside shape determining member. That is, the impact absorbing portion 18 and the bumper reinforcement 16 are able to be formed in one piece by using a casting method according to the free casting method.

In this example embodiment, the bumper reinforcement 16 on the front side is described, but the structure of the example embodiment may also be applied to a bumper reinforcement on the rear side.

While an example embodiment of the invention has been described, the invention is not in any way limited to this example embodiment. Naturally, the example embodiment and the various modified examples may be used in any suitable combination, and the invention may be carried out in any one of a variety of modes within the scope of the invention.

What is claimed is:

1. A vehicle bumper comprising:
   a bumper reinforcement that is arranged such that a length direction of the bumper reinforcement is in coincidence with a vehicle width direction; and
   an impact absorbing portion that extends from the bumper reinforcement toward a vehicle cabin inside,
   wherein
   the impact absorbing portion and the bumper reinforcement are formed in one piece,
   the impact absorbing portion is less rigid than the bumper reinforcement,
   a sectional shape of the bumper reinforcement when the bumper reinforcement is cut in a vehicle front-rear direction orthogonal to the length direction of the bumper reinforcement is a closed sectional structure, and
   a thickness of an outside wall of the bumper reinforcement at a center portion of the bumper reinforcement in the length direction is thicker than the thickness of the outside wall of the bumper reinforcement at an end portion of the bumper reinforcement in the length direction.

2. The vehicle bumper according to claim 1, wherein the impact absorbing portion is provided with a widened portion that widens in the vehicle width direction, the widened portion being provided on a bumper reinforcement side of the impact absorbing portion.

3. The vehicle bumper according to claim 2, wherein the widened portion of the impact absorbing portion includes a first widened portion provided on an outside in the vehicle width direction on the bumper reinforcement side of the impact absorbing portion, and a second widened portion provided on an inside in the vehicle width direction on the bumper reinforcement side of the impact absorbing portion.

4. The vehicle bumper according to claim 2, wherein the widened portion of the impact absorbing portion widens in an arc shape from an outside wall of a front side member toward an end portion of the bumper reinforcement in the length direction; and the widened portion of the impact absorbing portion protrudes toward the outside in the vehicle width direction from the outside wall of the front side member.

5. The vehicle bumper according to claim 1, wherein the thickness of the outside wall of the bumper reinforcement becomes continuously thinner from the center portion of the bumper reinforcement in the length direction toward the end portion of the bumper reinforcement in the length direction.

6. The vehicle bumper according to claim 1, wherein the sectional shape of the bumper reinforcement when the bumper reinforcement is cut in the vehicle front-rear direction orthogonal to the length direction of the bumper reinforcement is a rectangular-shaped closed sectional structure.

7. The vehicle bumper according to claim 1, wherein a weak portion that compresses and deforms with respect to an impact force in a vehicle front-rear direction is formed on the impact absorbing portion.

8. The vehicle bumper according to claim 7, wherein the weak portion is formed by a plurality of grooves formed extending in a direction orthogonal to a length direction of the impact absorbing portion.

9. The vehicle bumper according to claim 1, wherein the impact absorbing portion and the bumper reinforcement are formed in one piece by a free casting method in which a mold is not used.

10. The vehicle bumper according to claim 9, wherein a manufacturing apparatus in the free casting method in which the mold is not used is provided with an outside shape determining member that forms an outside shape of a casting, and an inside shape determining member that forms an inside shape of the casting; and
a thickness of the casting and a shape of the casting are changed by changing a distance between the outside shape determining member and the inside shape determining member.

* * * * *